(12) United States Patent
Hales et al.

(10) Patent No.: US 8,996,250 B2
(45) Date of Patent: Mar. 31, 2015

(54) INERTIA COMPENSATION WITH FREQUENCY DEPENDENT DAMPING

(75) Inventors: Michael K. Hales, Midland, MI (US);
Steven D. Klein, Munger, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 298 days.

(21) Appl. No.: 13/596,122

(22) Filed: Aug. 28, 2012

(65) Prior Publication Data
US 2013/0066520 A1  Mar. 14, 2013

Related U.S. Application Data

(60) Provisional application No. 61/532,933, filed on Sep. 9, 2011.

(51) Int. Cl.
*G06F 7/00* (2006.01)
*B62D 5/04* (2006.01)
*G06F 17/00* (2006.01)

(52) U.S. Cl.
CPC .................................. *B62D 5/0463* (2013.01)
USPC ................................................ 701/41; 701/1

(58) Field of Classification Search
CPC ...... B62D 5/0463; B62D 7/159; B62D 6/008; B62D 6/003; B60T 8/1755
USPC ...................................................... 701/1, 41
See application file for complete search history.

(56) References Cited

U.S. PATENT DOCUMENTS

| | | | | |
|---|---|---|---|---|
| 5,919,241 A * | 7/1999 | Bolourchi et al. | ............... | 701/41 |
| 5,992,556 A * | 11/1999 | Miller | ........................... | 180/446 |
| 6,122,579 A * | 9/2000 | Collier-Hallman et al. | .... | 701/41 |
| 6,397,969 B1 * | 6/2002 | Kasai et al. | .................... | 180/404 |
| 6,470,994 B1 * | 10/2002 | Shimizu et al. | ............... | 180/446 |
| 6,499,559 B2 * | 12/2002 | Mc Cann et al. | ............. | 180/446 |
| 2002/0179362 A1 * | 12/2002 | Norman et al. | ............... | 180/446 |
| 2003/0074120 A1 * | 4/2003 | Kleinau | .......................... | 701/41 |
| 2004/0133321 A1 * | 7/2004 | Ghoneim et al. | ............... | 701/41 |
| 2008/0023256 A1 * | 1/2008 | Krieger et al. | ................ | 180/444 |
| 2010/0211262 A1 * | 8/2010 | Kushiro | .......................... | 701/41 |

(Continued)

FOREIGN PATENT DOCUMENTS

| | | |
|---|---|---|
| EP | 2322410 A1 | 5/2011 |
| JP | 2006199219 A | 8/2006 |
| WO | 2012133590 A1 | 4/2012 |

OTHER PUBLICATIONS

European Search Report for EP Application No. 12183474.1, dated May 17, 2013, 6 pages.

*Primary Examiner* — Ian Jen
(74) *Attorney, Agent, or Firm* — Cantor Colburn LLP

(57) ABSTRACT

A control system for an electric power steering system is provided. The system includes a motor and a control module in communication with the motor. The control module provides a compensation command to the motor. The control modules includes a frequency dependent damping module for determining a frequency dependent damping (FDD) coefficient based on a base assist command and a vehicle speed. The control module includes a coefficient module for determining a plurality of filter coefficients. The filter coefficients are based on the FDD coefficient, the vehicle speed, and an inertia compensation coefficient. The control module includes a filter module for determining the compensation command based on the plurality of filter coefficients.

20 Claims, 8 Drawing Sheets

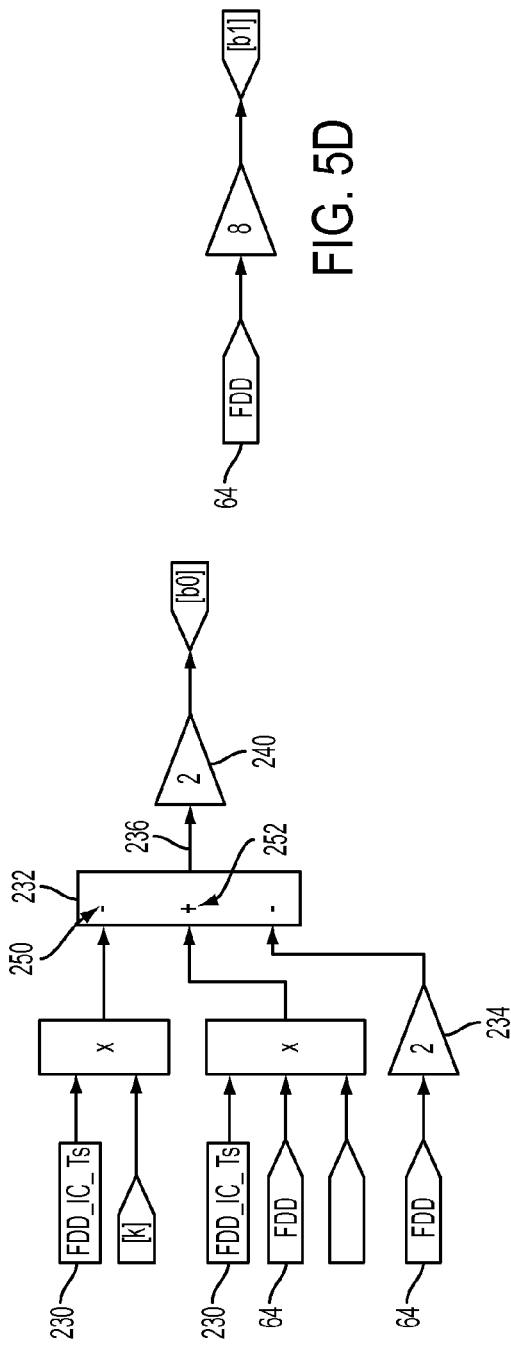
FIG. 5C
FIG. 5D
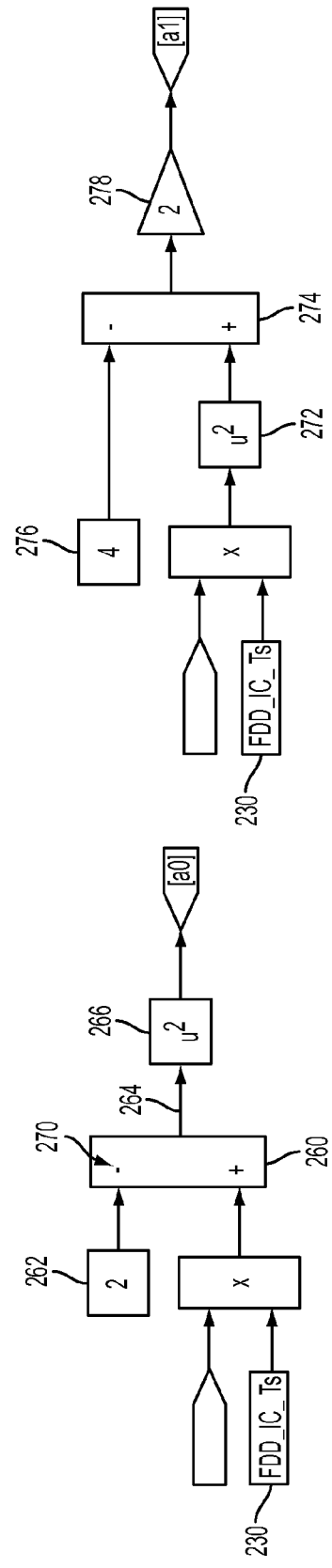
FIG. 5E
FIG. 5F

INERTIA COMPENSATION WITH FREQUENCY DEPENDENT DAMPING

CROSS-REFERENCES TO RELATED APPLICATIONS

This patent application claims priority to U.S. Provisional Patent Application Ser. No. 61/532,933 filed Sep. 9, 2011 which is hereby incorporated herein by reference in its entirety.

BACKGROUND OF THE INVENTION

The present invention relates to a control system for a power steering system, and more particularly to a control system for providing a compensation command based on a frequency dependent damping (FDD) coefficient and an inertia compensation coefficient.

Electric Power Steering (EPS) systems steering assistance to a driver by providing a specific amount of assist torque to a steering system. The assist torque is provided by an electric motor. However, the motor adds additional motor inertia to the steering system. Specifically, the motor inertia may affect the haptic feel of the steering system. As a result, a driver may need to apply torque to a handwheel in order to accelerate and decelerate the handwheel due to the motor inertia. This condition is sometimes referred to as inertia feel.

Various algorithms have been developed to compensate for the additional motor inertia introduced to the steering system. One approach in particular uses a filter on a motor velocity sensor to emulate a derivative calculation that determines motor acceleration. The motor acceleration is multiplied by the motor inertia, and the product of the motor acceleration and the motor inertia represents the torque required to achieve the acceleration of the motor inertia. This torque is then generated by the motor. Thus, the torque required to accelerate or decelerate the handwheel is provided by the motor, instead of a driver. However, one shortcoming of this approach is that the inertia of the motor is not compensated for until the motor starts moving. The result is a lack of compensation as the motor is initially accelerated or decelerated.

Another shortcoming is that there are often other EPS algorithms that make use of filtered motor velocity. These algorithms, if not properly coordinated with the above-mentioned inertia compensation scheme, may provide unexpected results. One such function may be referred to as frequency dependent damping, which adds a damping compensation torque proportional to high-frequency motor velocity signals.

SUMMARY OF THE INVENTION

According to one aspect of the invention, a control system for an electric power steering system is provided. The system includes a motor and a control module in communication with the motor. The control module provides a compensation command to the motor. The control modules includes a frequency dependent damping module for determining a frequency dependent damping (FDD) coefficient based on a base assist command and a vehicle speed. The control module includes a coefficient module for determining a plurality of filter coefficients. The filter coefficients are based on the FDD coefficient, the vehicle speed, and an inertia compensation coefficient. The control module includes a filter module for determining the compensation command based on the plurality of filter coefficients.

According to another aspect of the invention, a method for controlling an electric power steering system is provided. The method includes determining a frequency dependent damping (FDD) coefficient based on a base assist command and a vehicle speed by a control module. The method includes calculating a plurality of filter coefficients based on the FDD coefficient, the vehicle speed, and an inertia compensation coefficient by a control module. The method includes providing a compensation command to a motor by the control module. The compensation command is based on the plurality of filter coefficients.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 5A-5F are an illustration of various filter coefficient calculation blocks of a filter coefficient module as shown in FIG. 2, in accordance with another aspect of the invention;

FIG. 7A is a graph illustrating the magnitude and FIG. 7B is a graph illustrating the phase of the filtered response.

DETAILED DESCRIPTION

Figure 1:
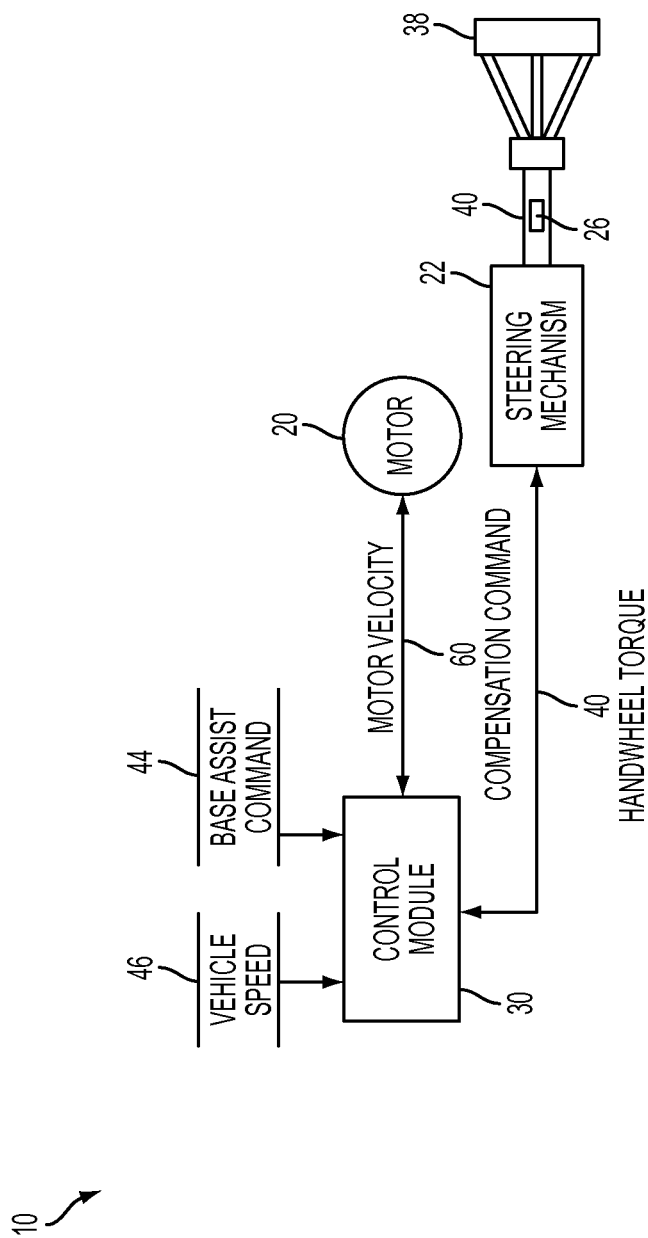
FIG. 1 is a block diagram of an electric power steering control system in accordance with an exemplary embodiment of the invention.

Referring now to the Figures, where the invention will be described with reference to specific embodiments, without limiting same, FIG. 1 is a schematic illustration of an exemplary power electric steering system 10. The power steering system 10 includes a motor 20, a steering mechanism 22, a torque sensor 26, and a control module 30. In the embodiment as shown in FIG. 1, the control module 30 is in communication with the motor 20, the steering mechanism 22, and the torque sensor 26. The motor 20 is an electric motor for providing torque assist to the steering mechanism 22. The steering mechanism 22 may include a handwheel 38 that is coupled to an upper steering shaft 40. In one embodiment, the power steering system 10 may be part of a vehicle (not shown) where the torque sensor 26 detects an amount of torque exerted on the handwheel 38 by a driver.

Figure 2:
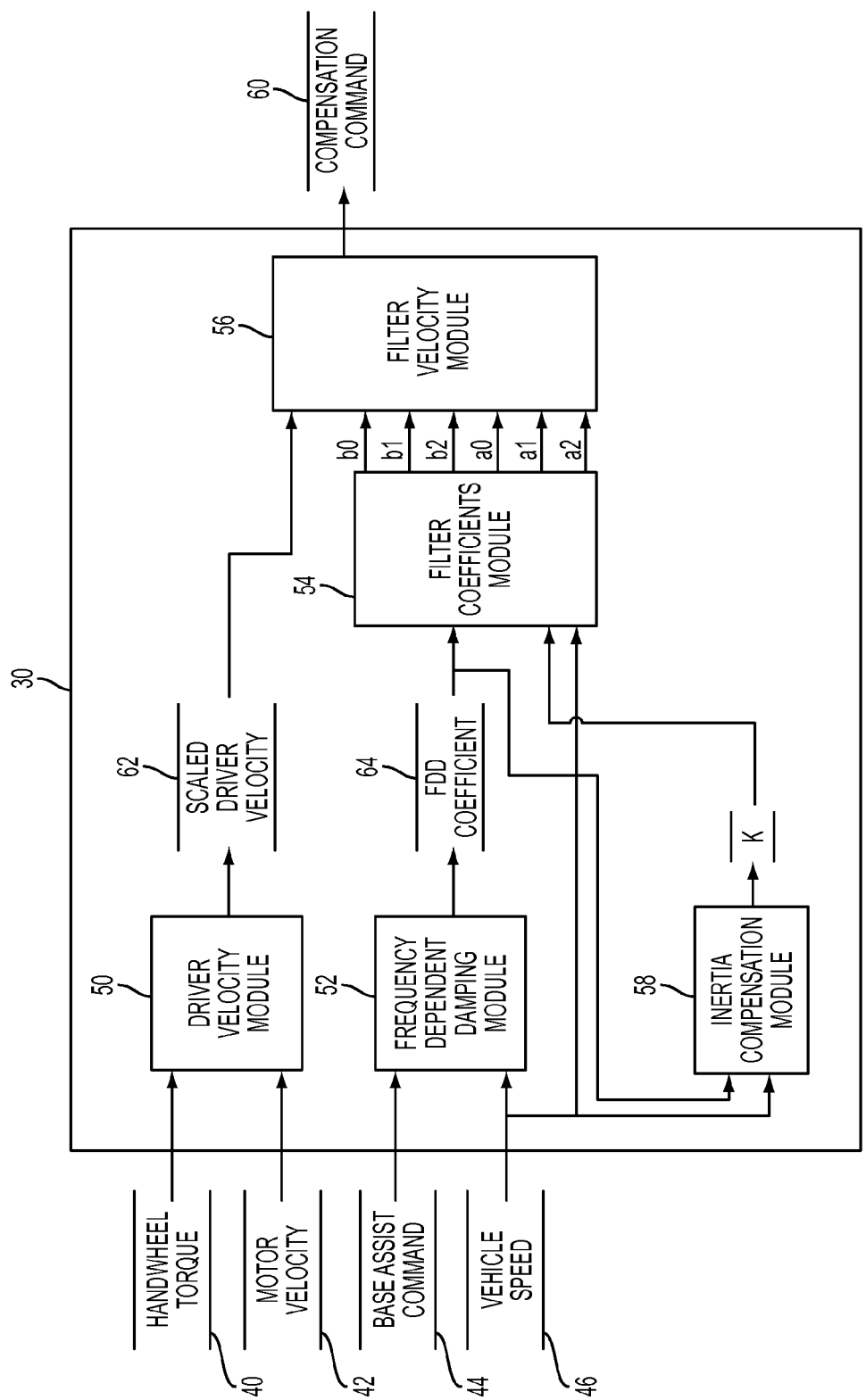
FIG. 2 is a dataflow diagram illustrating the electric power steering control system in accordance with another exemplary embodiment of the invention.

The control module 30 controls the operation of the power steering system 10. Referring now to FIG. 2, a dataflow diagram illustrates an exemplary embodiment of the control module 30 of FIG. 1 used to control the power steering system 10 of FIG. 1. In various embodiments, the control module 30 may include one or more sub-modules and datastores. As used herein the terms module and sub-module refer to an application specific integrated circuit (ASIC), an electronic circuit, a processor (shared, dedicated, or group) and memory that executes one or more software or firmware programs, or a combinational logic circuit. As can be appreciated, the sub-modules shown in FIG. 2 can be combined and/or further partitioned. Inputs to the control module 30 may be generated from the motor 20, the steering mechanism 22, the torque sensor 26, from other control modules (not shown), may be modeled, and/or may be predefined.

With reference to both FIGS. 1-2, the control module 30 receives as inputs a handwheel torque 40, a motor velocity 42, a base assist command 44, and a vehicle speed 46. The handwheel torque 40 may be monitored by the torque sensor 26 shown in FIG. 1. The motor velocity 42 is based on the velocity of the motor 20 shown in FIG. 1. The base assist command 44 indicates the amount of torque that is applied by the motor 20 for driver assist. The base assist command 44 is a function of the handwheel torque 40 and the vehicle speed 46. The control module 30 includes a driver velocity module 50, a frequency dependent damping (FDD) module 52, a filter coefficient module 54, a filter velocity module 56, and an inertia compensation module 58 that are used to determine a compensation command 60 that is provided to the motor 20 (shown in FIG. 1).

Figure 3:
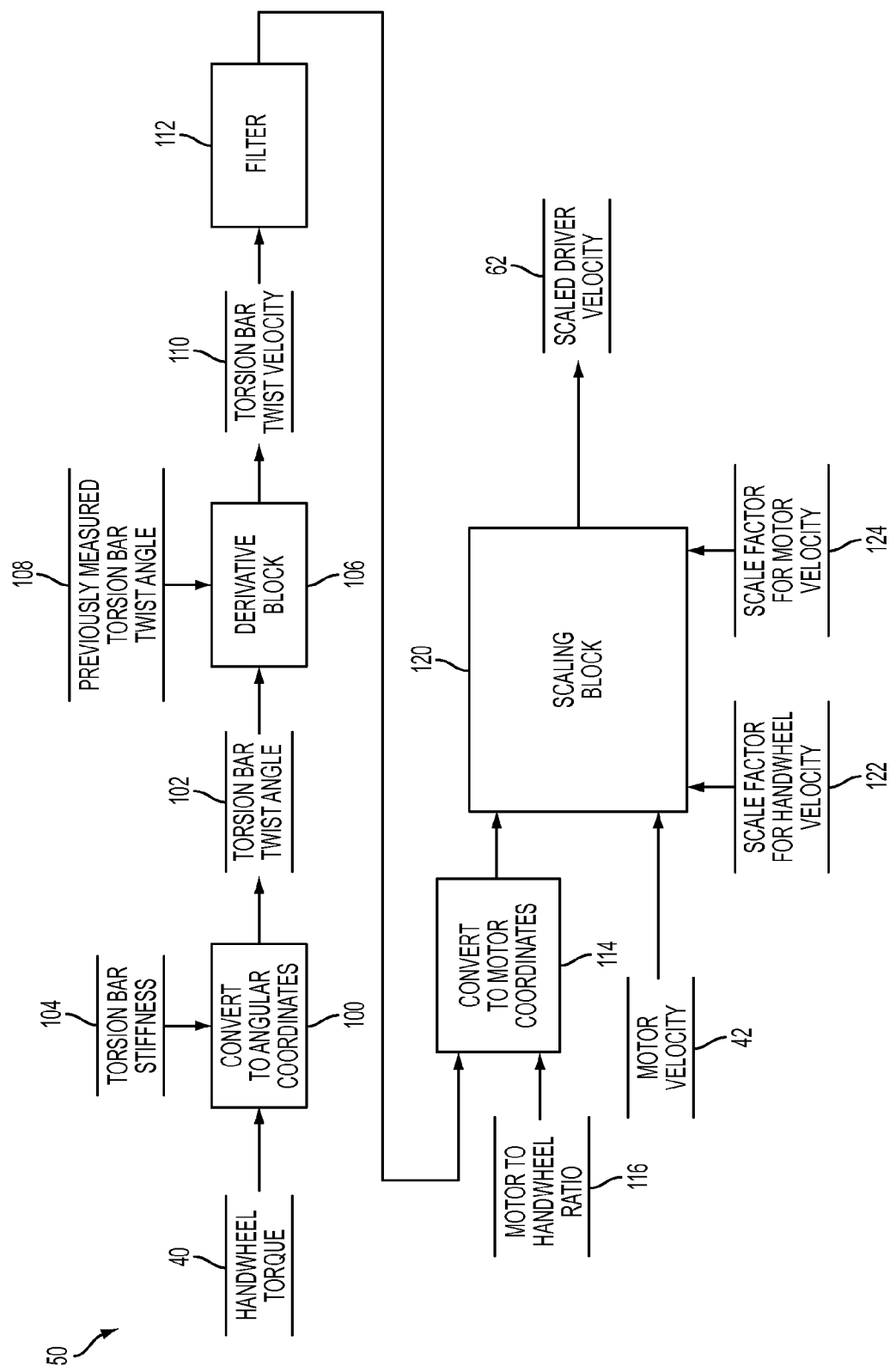
FIG. 3 is an illustration of a driver velocity module shown in FIG. 2, in accordance with another aspect of the invention.

The driver velocity module 50 receives as inputs the handwheel torque 40 and the motor velocity 42, and determines a scaled driver velocity value 62 based on the inputs. Specifically, FIG. 3 is an exemplary illustration of the driver velocity module 50. Block 100 converts the handwheel torque 40 into a torsion bar twist angle 102 that is measured in angular coordinates. In one approach, a torsion bar stiffness constant 104 may be used to determine the torsion bar twist angle 102 (e.g., if the torque sensor 26 shown in FIG. 1 is a torsion-bar type torque sensor). The torsion bar twist angle 102 is sent to a derivative block 106. The derivative block 106 receives as inputs the torsion bar twist angle 102 and a previously measured torsion bar twist angle 108 to determine a torsion bar twist velocity 110. The torsion bar twist velocity 110 is sent to a filter 112. The filter 112 is used to reduce noise in the torsion bar twist velocity 110. In one approach, the filter 112 may be a first-order filter, however it is to be understood other types of filters may be used as well. The torsion bar twist velocity 110 is then sent to block 114, where the torsion bar twist velocity 110 is converted into motor coordinates. Specifically, a motor to handwheel ratio 116 is sent to block 114 to convert the torsion bar twist velocity 110 into motor coordinates.

The torsion bar twist velocity 110 in motor coordinates and the motor velocity 42 are sent to a scaling block 120. The scaling block 120 also receives as input a scale factor for handwheel velocity 122 and a scale factor for motor velocity 124 (the scale factors 122 and 124 may be saved in memory as a lookup table). The scaling block 120 determines the scaled driver velocity 62 based on the motor velocity 42, the torsion bar twist velocity 110, the scale factor for handwheel velocity 122, and the scale factor for motor velocity 124. The scaled driver velocity 62 allows for inertia compensation commands to be generated before the motor 20 (shown in FIG. 1) begins movement. This is because the torque sensor 26 (shown in FIG. 1) may indicate an amount of force a driver is exerting on the handwheel 38 (e.g., the handwheel torque 40) before the motor 20 actually starts movement.

Referring to FIG. 2, the FDD module 52 receives as input the base assist command 44 and the vehicle speed 46, and determines an FDD coefficient 64 based on the inputs. The FDD module 52 is illustrated in greater detail in FIG. 4.

Figure 4:
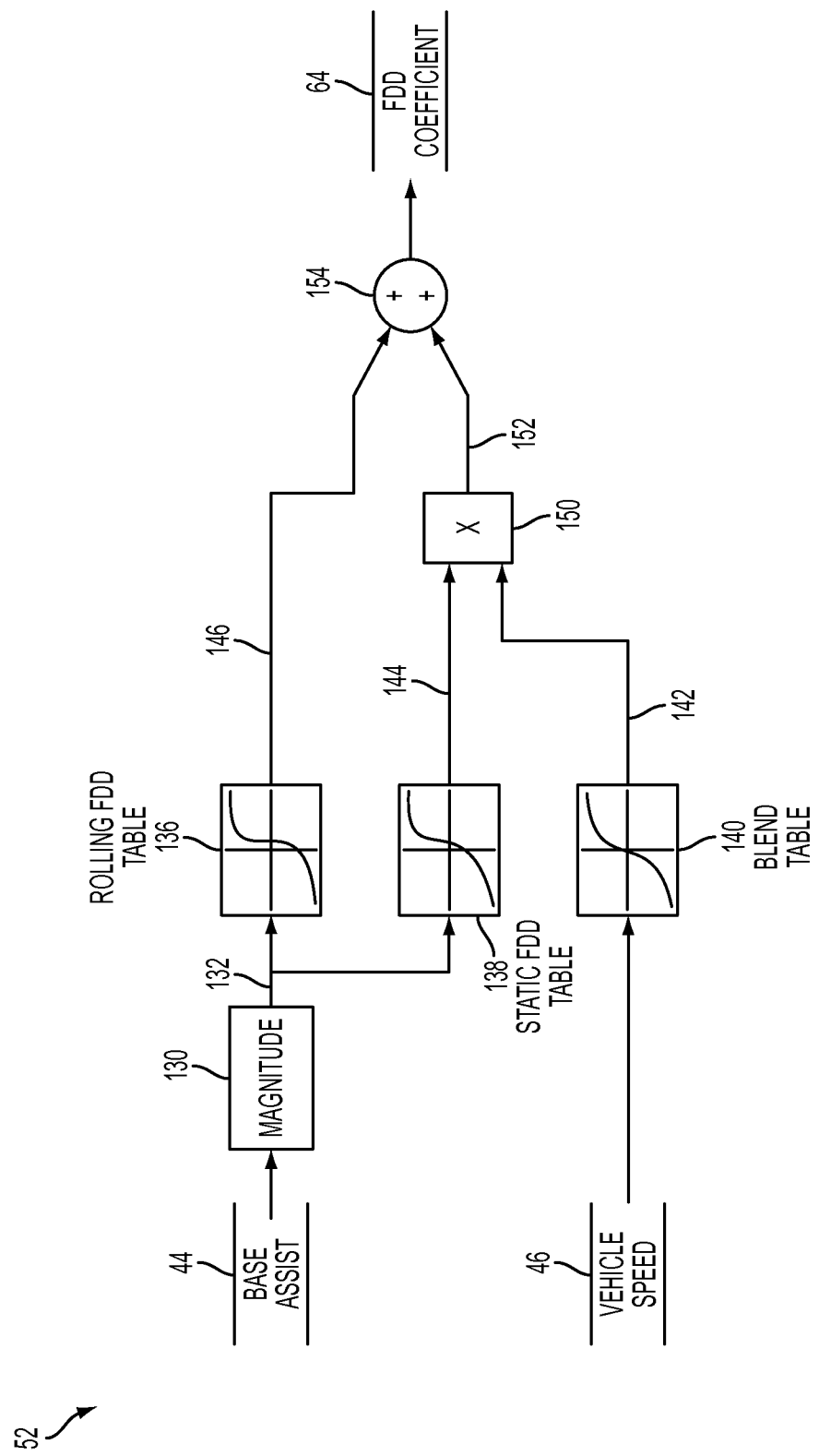
FIG. 4 is an illustration of a frequency dependent damping (FDD) module shown in FIG. 2, in accordance with yet another aspect of the invention.

Referring now to FIG. 4, the base assist 44 is sent to a magnitude block 130. A magnitude 132 of the base assist 44 is then sent to both a rolling FDD table 136 and a static FDD table 138. The rolling FDD table 136 is a look-up table that determines the FDD coefficient 64 if a vehicle is in motion (e.g., a non-zero vehicle speed). The static FDD table 138 is a look-up table that determines the FDD coefficient 64 if a vehicle is at rest (e.g., zero vehicle speed). A blend table 140 is also provided, which determines a scale factor 142 between 0 and 1 that is based on the vehicle speed 46. For example, a blend value of 1 means that the FDD coefficient 64 is a static FDD coefficient 144 (e.g., based on the static FDD table 138), and a blend value of 0 means that the FDD coefficient 64 is a rolling FDD coefficient 146 (e.g., based on the rolling FDD table 136). The scale factor 142 and the static FDD coefficient 144 are sent to a multiplier 150. A product 152 of the multiplier 150 and the rolling FDD coefficient 146 are sent to a summing junction 154 to determine the FDD coefficient 64.

Figure 5A:
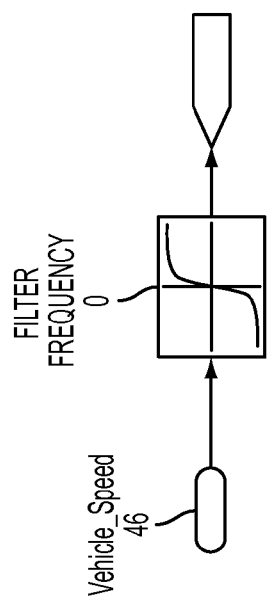
Figure 5B:
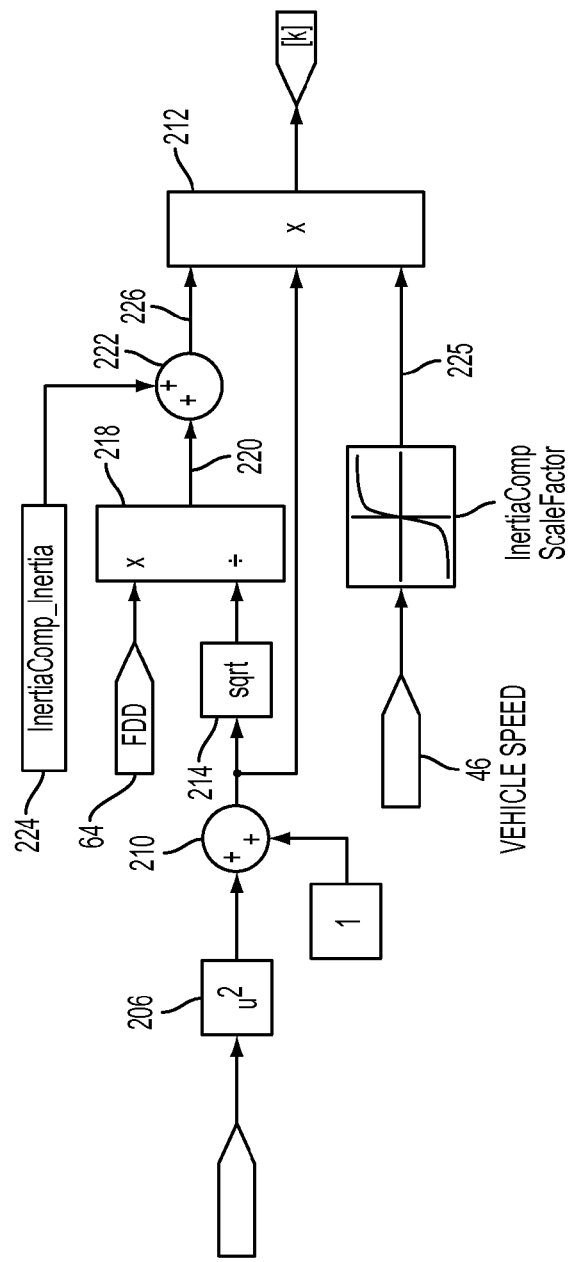

Referring to FIG. 2, the inertia compensation module 58 receives as inputs the vehicle speed 46 and the FDD coefficient 64 to determine an inertia compensation coefficient k. FIGS. 5A-5B illustrate an exemplary approach for determining the inertia compensation coefficient k. FIG. 5A is an exemplary illustration of an approach to calculate a frequency midpoint $\Omega$. The frequency midpoint $\Omega$ generally represents a midpoint between the frequency dependent damping and the inertia compensation value as seen in FIG. 7. The frequency midpoint $\Omega$ is determined by sending the vehicle speed 46 to a frequency look-up table 200 to determine a corresponding frequency value.

FIG. 5B illustrates an exemplary approach for calculating an inertia compensation coefficient k based on the frequency midpoint $\Omega$. The inertia compensation coefficient k compensates for the inertia of the motor 20 (shown in FIG. 1) as well as inertia that is added to the system by calculation of the FDD coefficient 64. The frequency midpoint $\Omega$ is squared in block 206, and is sent to a summing junction 210. The output of the summing junction 210 is sent to a multiplier 212 as well as block 214, which determines a square root 216 of the output of the summing junction 210. The square root 216 is sent to block 218 along with the FDD coefficient 64. It should be noted that the FDD coefficient 64 may introduce an inertia effect into the steering system 10. Block 218 is provided to compensate for the inertia effect introduced by the FDD coefficient 64. The output 220 of block 218 (e.g., the compensation value for the inertia effect created by the FDD coefficient 64) is sent to a summing junction 222.

An inertia compensation value 224 is also sent to the summing junction 222. The inertia compensation value 224 represents the inertia of the actual physical system (e.g., the steering system 10). An output 226 of the summing junction is sent to the multiplier 212. An inertia compensation scale factor 225 based on the vehicle speed 46 is also sent to the multiplier 212. In one approach, the inertia compensation scale factor 225 generally ranges from about 0 to about 2. The multiplier 212 receives as input the output of the summing junction 210, the output 226, and the inertia compensation scale factor 224 to determine the inertia compensation coefficient k.

Referring to FIG. 2, the filter coefficient module 54 receives as inputs the FDD coefficient 64, the vehicle speed 46, and the inertia compensation coefficient k. In the exemplary embodiment as shown in FIG. 2, the filter coefficient module 54 calculates six coefficients labeled as a0, a1, a2, b0, b1, and b2. It should be noted that while six coefficients are illustrated in FIG. 2, more than six coefficients may be calculated as well (e.g., at least six coefficients are generally calculated by the filter coefficient module 54). The coefficients a0, a1, a2, b0, b1, and b2 are based on both the FDD coefficient and an inertia compensation coefficient or value (shown in FIG. 5B as reference number 224) of the steering system 10.

Figure 7A:
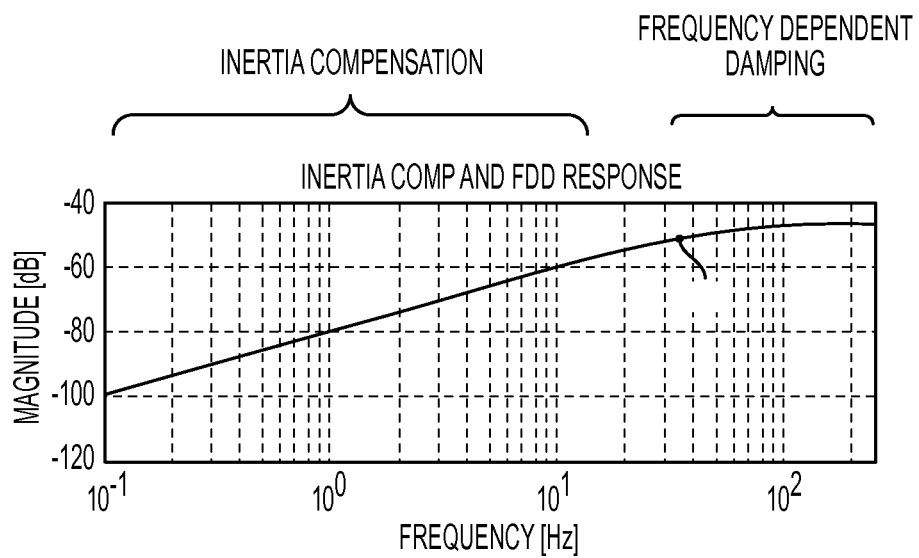
FIGS. 7A-7B are graphs illustrating an exemplary filtered response of the steering system, where
Figure 7B:
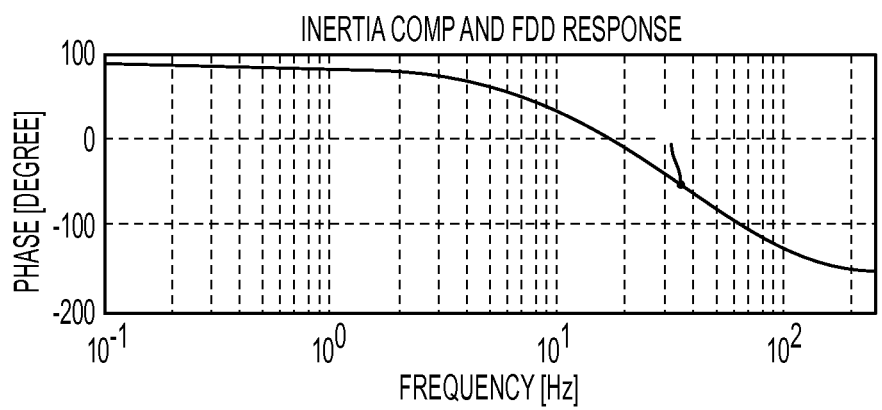

The coefficients a0, a1, a2, b0, b1, and b2 are used to determine how the inertia compensation and the frequency dependent damping are combined together. For example, turning now to FIGS. 7A-7B, an exemplary filtered response of the combined inertia compensation and frequency dependent damping is illustrated, where FIG. 7A is a graph illustrating the magnitude and FIG. 7B is a graph illustrating phase of the filtered response. The graphs illustrated in FIGS. 7A-7B indicate the approximate frequency ranges used for inertia compensation and frequency dependent damping. Specifically, in the exemplary embodiment as shown in FIGS. 7A-7B, the inertia compensation begins transitioning into the frequency dependent damping between about 10 Hz to about 20 Hz.

FIGS. 5C-5F illustrates one approach of calculating the coefficients a0, a1, a2, b0, b1, and b2. FIG. 5C is an exemplary approach for determining the coefficient b0. In the embodiment as shown in FIG. 5C, an FDD time constant 230 and the inertia compensation coefficient k are multiplied together and sent to block 232. The FDD time constant 230, the FDD coefficient 64, and the frequency midpoint Ω are multiplied together and also sent to the block 232. The FDD coefficient 64 is multiplied by a gain factor 234 (e.g., 2) and is also sent to the block 232. An output 236 of the block 232 is multiplied by a gain factor 240 (e.g., 2) to determine the coefficient b0. Moreover, the approach as shown in FIG. 5C may also be used to calculate the coefficient b2, except that a negative sign 250 is changed to a positive sign, and a positive sign 252 is changed to a negative sign (however, it should be noted that b0 is not equal to −b2).

FIG. 5D is an exemplary approach for determining the coefficient b1. In the embodiment as shown in FIG. 5D, the FDD coefficient 64 is multiplied by a gain factor (e.g., 8) to determine the coefficient b1.

FIG. 5E is an exemplary approach for determining the coefficient a0. In the embodiment as shown in FIG. 5E, the FDD time constant 230 and the frequency midpoint Ω are multiplied together and sent to block 260. A constant 262 (e.g., 2) is also sent to block 260. An output 264 of the block 260 is squared by block 266 to determine the coefficient a0. The approach as shown in FIG. 5E may be used to calculate the coefficient a2 as well, except that a negative sign 270 is changed to a positive sign.

FIG. 5F is an exemplary approach for determining the coefficient a1. In the embodiment as shown in FIG. 5F, the FDD time constant 230 and the frequency midpoint Ω are multiplied together and then squared in block 272. The output of block 272 is sent to block 274. A constant 276 (e.g., 4) is also sent to block 274. The output of block 274 is multiplied by a gain factor 278 (e.g., 2) to determine the coefficient a1.

Figure 6:
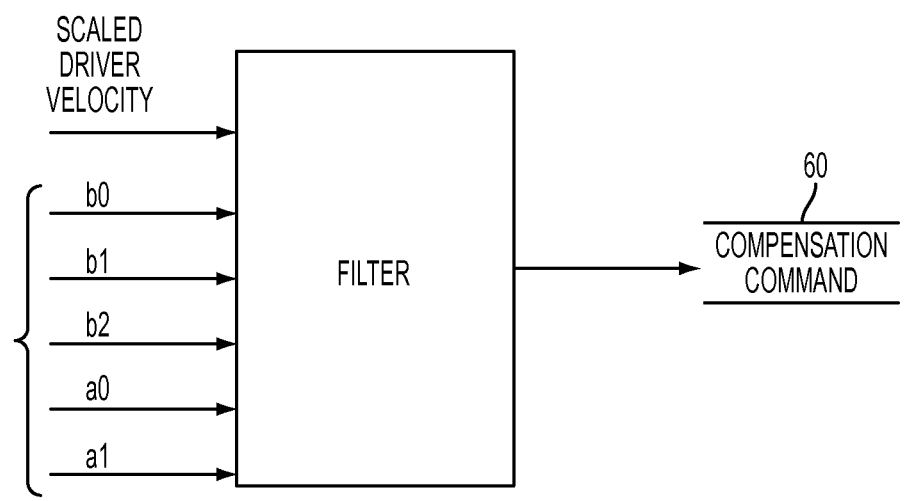
FIG. 6 is an illustration of the filter velocity module shown in FIG. 2, in still yet another aspect of the invention.

Referring to FIG. 2, the coefficients a0, a1, a2, b0, b1, and b2 and the scaled driver velocity 62 are sent to the filter velocity module 56. FIG. 6 is an exemplary illustration of the filter velocity module 56. A filter 300 is provided that receives the coefficients a0, a1, a2, b0, b1, and b2 and the scaled driver velocity 62 and determines the compensation command 60. In one embodiment, the filter 300 may be a second order filter, however, it is to be understood that other types of filters may be used as well.

Referring generally to FIGS. 1-7B, the steering system 10 as described has a coordinated response combining the inertia compensation and the frequency dependent damping together using various coefficients (e.g., the coefficients a0, a1, a2, b0, b1, and b2). By actively combining the inertia compensation and the frequency dependent damping together, both functions may co-exist on the same system, thereby addressing various issues that were intended to be solved by each function separately. Specifically, for example, the frequency dependent damping function generally adds inertia into the steering system 10. The additional inertia created by the frequency dependent damping function is compensated using the approach as described in FIGS. 1-7B (e.g., by the inertia compensation coefficient k). Moreover, as shown in FIG. 2, the scaled driver velocity 62 allows for the frequency dependent damping and the inertia compensation commands to be generated before the motor 20 (shown in FIG. 1) begins movement. This is because the torque sensor 26 (shown in FIG. 1) may indicate an amount of force a driver is exerting on the handwheel 38 before the motor 20 actually starts moving. Thus, unlike some approaches that are currently available which only use motor velocity, the inertia of the motor 20 may be compensated as the motor 20 is initially accelerated and decelerated. Moreover, the inertia compensation of the motor 20 may be more indicative of driver behavior (e.g., the torque exerted on the handwheel 38) when compared to some other approaches currently available.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a power steering system, comprising:
    a motor;
    a control module in communication with the motor, the control module providing a compensation command to the motor, the control module comprising:
        a frequency dependent damping module for determining a frequency dependent damping (FDD) coefficient based on a base assist command and a vehicle speed;
        a coefficient module for determining a plurality of different filter coefficients based on corresponding different combinations of the FDD coefficient, the vehicle speed, and an inertia compensation coefficient; and
        a filter module for determining the compensation command based on the plurality of filter coefficients.

2. The control system in claim 1, comprising a driver velocity module that determines a scaled driver velocity value, wherein the scaled driver velocity value is sent to the filter module.

3. The control system in claim 2, wherein the driver velocity module determines the scaled driver velocity value based on a handwheel torque and a motor velocity.

4. The control system in claim 3, wherein a torque sensor detects an amount of torque exerted on a handwheel to determine the handwheel torque.

5. The control system in claim 2, wherein the compensation command is based on the scaled driver velocity.

6. The control system in claim 1, wherein at least six different filter coefficients are used to determine the compensation command.

7. The control system in claim 1, wherein at least one of the plurality of filter coefficients is based on a frequency midpoint, and wherein the frequency midpoint is determined by sending the vehicle speed to a frequency look-up table to determine a corresponding frequency value.

8. The control system in claim 7, comprising an inertia compensation module that determines the inertia compensation coefficient, wherein at least one of the plurality of filter coefficients is based on the inertia compensation coefficient, wherein the inertia compensation coefficient is based on the frequency midpoint, the FDD coefficient, and an inertia compensation value.

9. The control system in claim 8, wherein the inertia compensation value represents a portion of an inertia of the power steering system.

10. The control system in claim 7, wherein the FDD coefficient introduces an inertia effect into the power steering system, and wherein a FDD compensation value is determined based on the inertia effect.

11. The control system in claim 10, wherein the inertia compensation coefficient is based on the FDD compensation value.

12. The control system in claim 1, wherein the filter module includes at least a second order filter.

13. A method of controlling a power steering system, comprising:
   determining a frequency dependent damping (FDD) coefficient based on a base assist command and a vehicle speed by a control module;
   calculating a plurality of different filter coefficients based on corresponding different combinations of the FDD coefficient, the vehicle speed, and an inertia compensation coefficient by a control module; and
   providing a compensation command to a motor by the control module, the compensation command based on the plurality of filter coefficients.

14. The method of claim 13, comprising determining a scaled driver velocity value by the control module, the scaled driver velocity based on a handwheel torque and a motor velocity.

15. The method of claim 14, comprising providing a torque sensor that detects an amount of torque exerted on a handwheel to determine the handwheel torque.

16. The method of claim 14, comprising basing the compensation command on the scaled driver velocity.

17. The method of claim 13, wherein at least six different filter coefficients are used to determine the compensation command.

18. The method of claim 13, wherein at least one of the plurality of filter coefficients is based on a frequency midpoint, and wherein the frequency midpoint is determined by sending the vehicle speed to a frequency look-up table to determine a corresponding frequency value.

19. The method of claim 18, wherein at least one of the plurality of filter coefficients is based on the inertia compensation coefficient, wherein the inertia compensation coefficient is based on the frequency midpoint, the FDD coefficient, and an inertia compensation value.

20. The method of claim 18, wherein the FDD coefficient introduces an inertia effect into the power steering system, and wherein a FDD compensation value is determined based on the inertia effect.

* * * * *